US012570500B2

(12) United States Patent
Roussel

(10) Patent No.: US 12,570,500 B2
(45) Date of Patent: Mar. 10, 2026

(54) ELEVATOR SAFETY SWITCHING SYSTEM AND METHOD FOR SWITCHING BETWEEN OPERATING MODES

(71) Applicant: Inventio AG, Hergiswil (CH)

(72) Inventor: Frank Olivier Roussel, Lucerne (CH)

(73) Assignee: INVENTIO AG, Hergiswil (CH)

( * ) Notice: Subject to any disclaimer, the term of this patent is extended or adjusted under 35 U.S.C. 154(b) by 1472 days.

(21) Appl. No.: 15/733,700

(22) PCT Filed: Jun. 21, 2019

(86) PCT No.: PCT/EP2019/066497
§ 371 (c)(1),
(2) Date: Sep. 30, 2020

(87) PCT Pub. No.: WO2020/002157
PCT Pub. Date: Jan. 2, 2020

(65) Prior Publication Data

US 2021/0101781 A1 Apr. 8, 2021

(30) Foreign Application Priority Data

Jun. 29, 2018 (EP) .................................... 18180696

(51) Int. Cl.
*B66B 13/22* (2006.01)
*B66B 5/00* (2006.01)

(52) U.S. Cl.
CPC ............ *B66B 5/0031* (2013.01); *B66B 13/22* (2013.01); *B66B 5/005* (2013.01); *B66B 5/0087* (2013.01)

(58) Field of Classification Search
CPC ........ B66B 5/005; B66B 5/0031; B66B 13/22
See application file for complete search history.

(56) References Cited

U.S. PATENT DOCUMENTS 4,750,591 A * 6/1988 Coste ..................... G09B 25/02 187/391
6,550,585 B2 * 4/2003 Schoppa ................ B66B 13/24 187/280

(Continued)

FOREIGN PATENT DOCUMENTS

CN 1286208 A 3/2001
CN 1644479 A 7/2005

(Continued)

*Primary Examiner* — Rina I Duda
(74) *Attorney, Agent, or Firm* — Shumaker, Loop & Kendrick, LLP

(57) ABSTRACT

An elevator system inspection control system and method for switching between normal and inspection operating modes includes a safety chain series circuit having at least one shaft or door contact switch and an operating device in an elevator shaft. The operating device includes a changeover switch for switching between modes. The safety chain is closed to drive an elevator car by establishing a current path between an electrical power source and a motor. When interrupted, the safety chain interrupts the current path thereby stopping the car. The control system includes a manual switch outside the shaft and a control element. The safety chain is closed or interrupted by activating or deactivating the control element while the current path to the motor remains permanently interrupted until the manual switch is actuated when the changeover switch switches the elevator system from the inspection operating mode to the normal operating mode.

13 Claims, 8 Drawing Sheets

(56) References Cited

U.S. PATENT DOCUMENTS

| | | | | |
|---|---|---|---|---|
| 7,178,635 | B2 * | 2/2007 | Meissner | B66B 9/00 187/314 |
| 7,891,467 | B2 * | 2/2011 | Kattainen | B66B 13/22 187/394 |
| 8,162,108 | B2 * | 4/2012 | Sirigu | B66B 5/0087 187/394 |
| 8,365,870 | B2 * | 2/2013 | Sirigu | B66B 13/16 187/391 |
| 8,552,738 | B2 | 10/2013 | Quinn | |
| 8,997,941 | B2 * | 4/2015 | Abad | B66B 1/32 187/247 |
| 9,415,972 | B2 * | 8/2016 | Tanaka | B66B 1/28 |
| 9,663,323 | B2 * | 5/2017 | Stolt | B66B 1/30 |
| 2003/0010576 | A1 | 1/2003 | Malone, Jr. | |
| 2003/0094332 | A1 | 5/2003 | Tinone et al. | |
| 2013/0041603 | A1 * | 2/2013 | Sonnenmoser | B66B 5/0037 702/58 |
| 2013/0118836 | A1 * | 5/2013 | Rossignol | B66B 1/3492 187/247 |
| 2016/0009526 | A1 * | 1/2016 | Mertala | B66B 5/0025 187/288 |

FOREIGN PATENT DOCUMENTS

| | | | |
|---|---|---|---|
| DE | 112011105918 | T5 | 9/2014 |
| EP | 2033927 | A1 | 3/2009 |
| EP | 2072450 | A1 | 6/2009 |
| EP | 2108608 | A1 | 10/2009 |
| EP | 2214998 | B1 | 5/2016 |
| EP | 3643674 | A1 | 4/2020 |
| JP | 2008143614 | A | 6/2008 |
| JP | 2009298566 | A | 12/2009 |
| JP | 2012180155 | A | 9/2012 |
| WO | 0051929 | A1 | 9/2000 |
| WO | 2006072195 | A1 | 7/2006 |
| WO | 2009073001 | A1 | 6/2009 |
| WO | 2010060950 | A1 | 6/2010 |
| WO | 2013084279 | A1 | 6/2013 |
| WO | 2013153044 | A1 | 10/2013 |
| WO | 2016096699 | A1 | 6/2016 |
| WO | 2016113456 | A1 | 7/2016 |
| WO | 2017008849 | A1 | 1/2017 |
| WO | 2017216910 | A1 | 12/2017 |
| WO | 2018001830 | A1 | 1/2018 |
| WO | 2021083884 | A1 | 5/2021 |

* cited by examiner

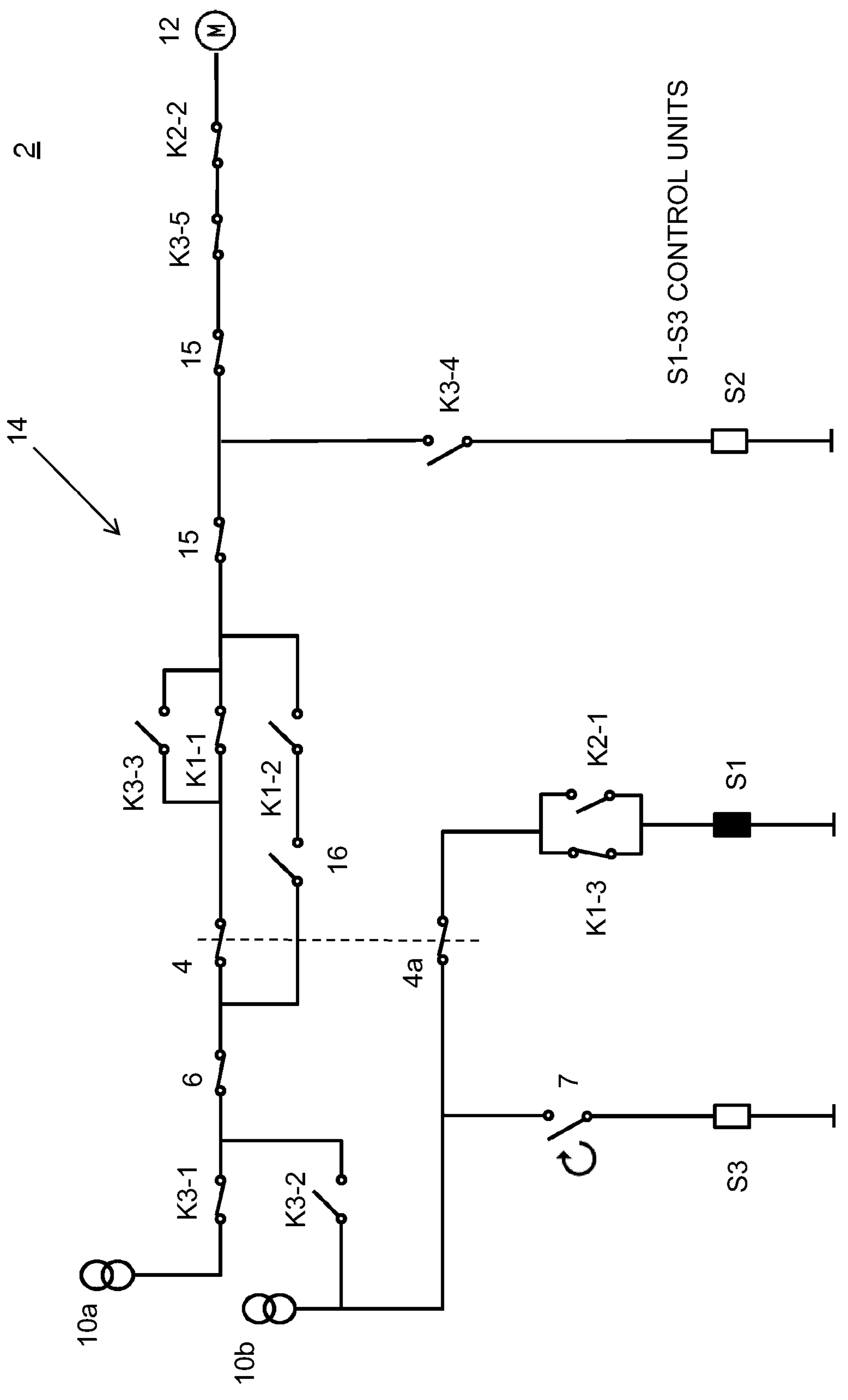
FIG 3.1

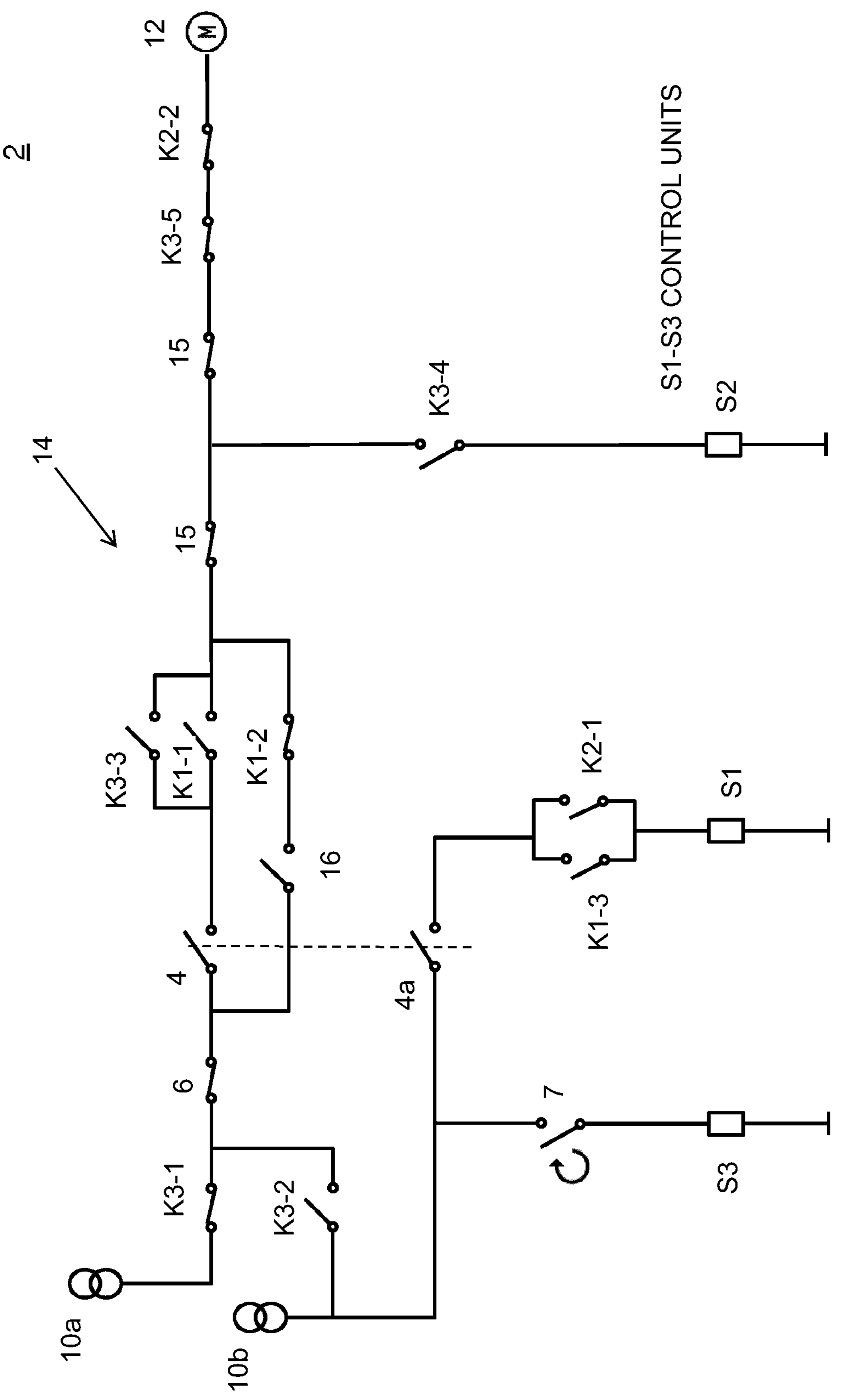
FIG 3.2

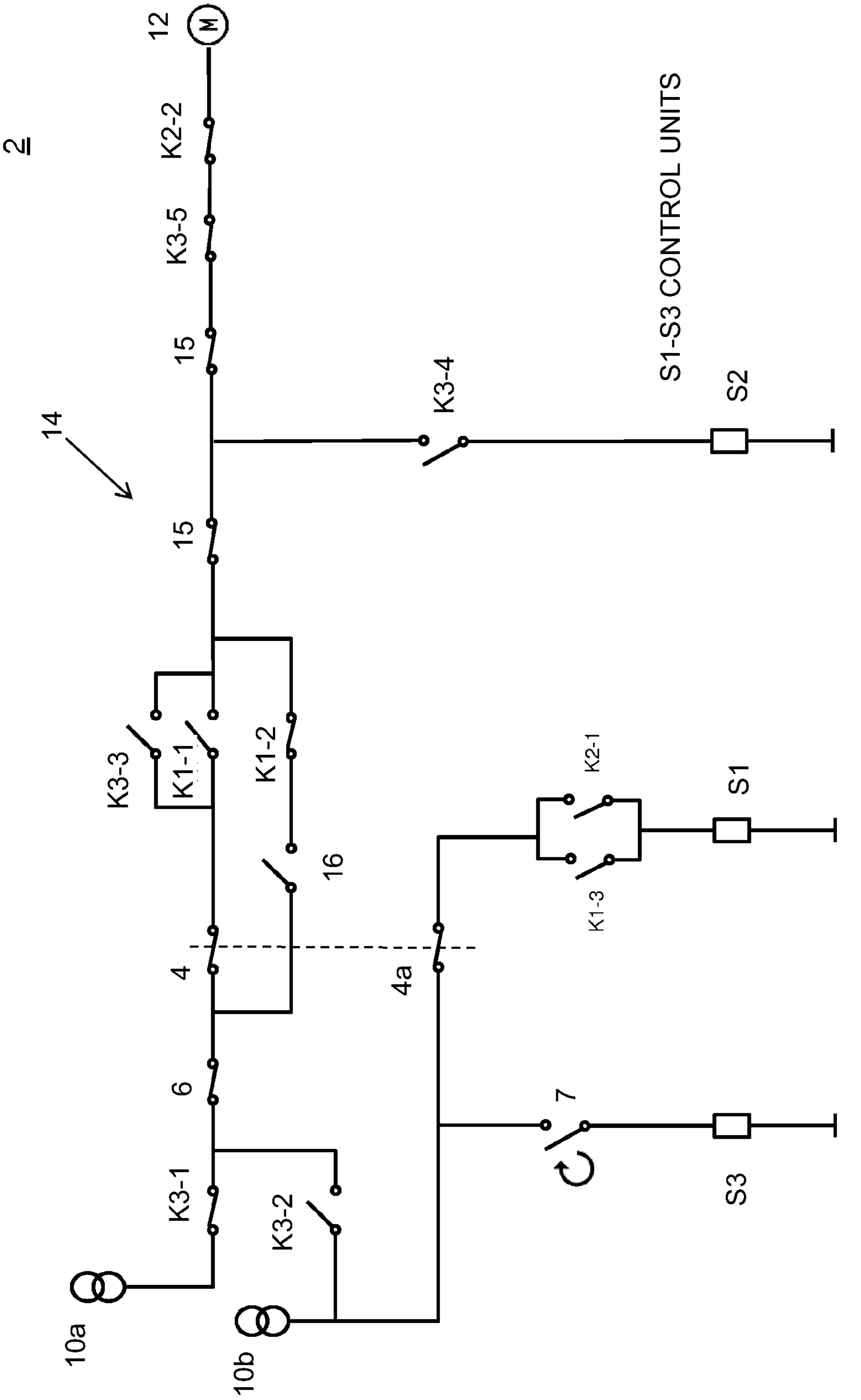
FIG 3.3

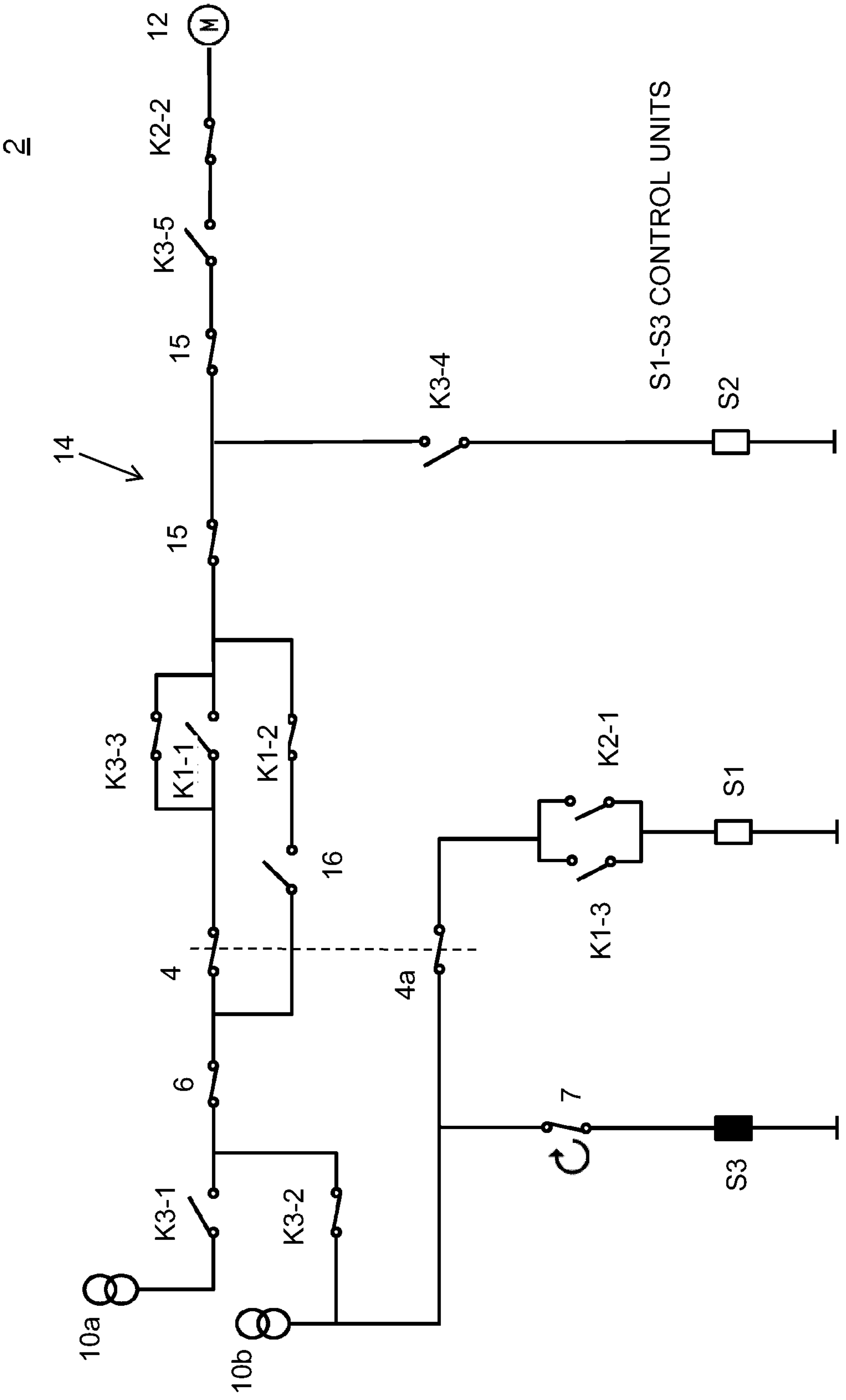
FIG 3.4

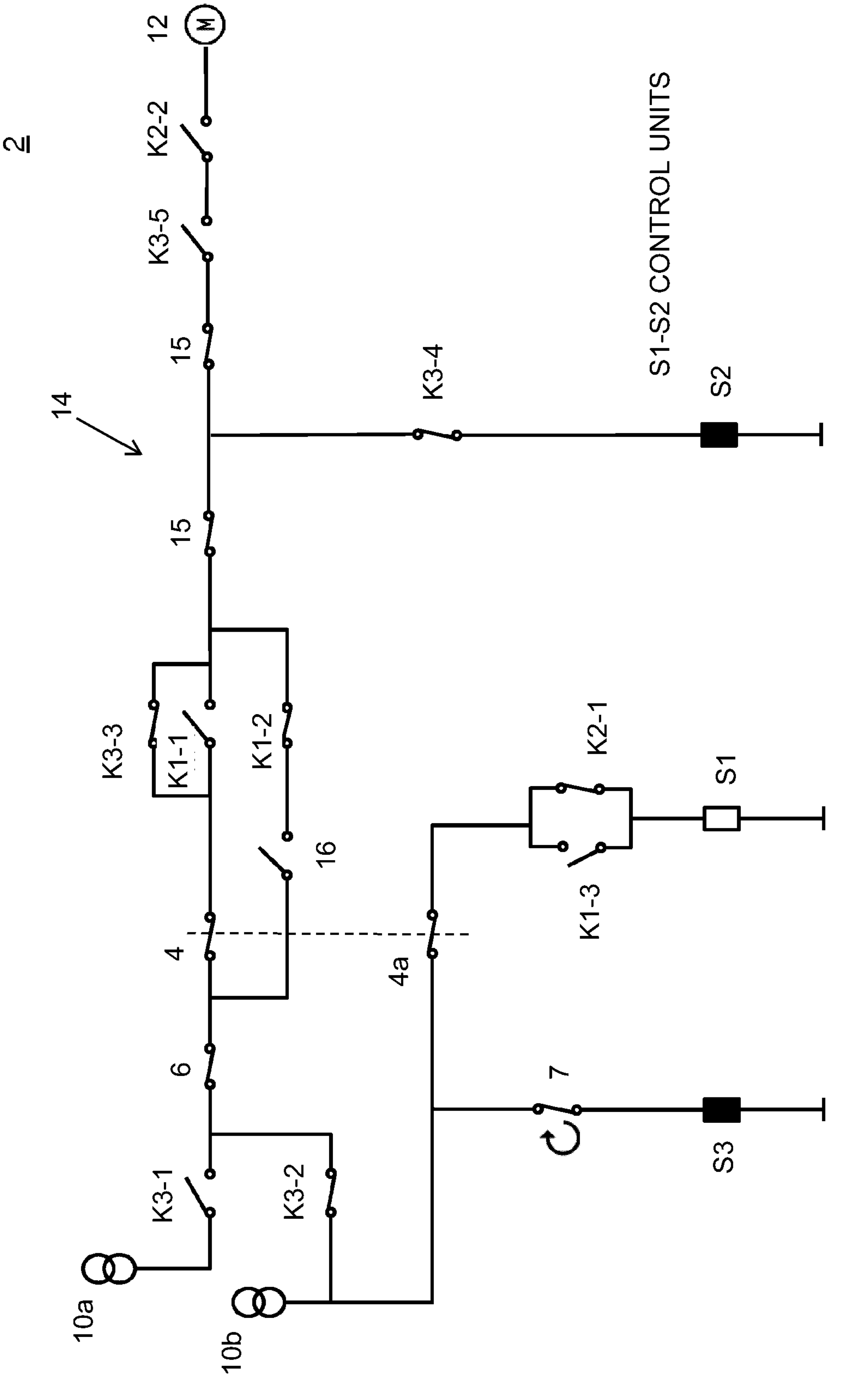
FIG 3.5

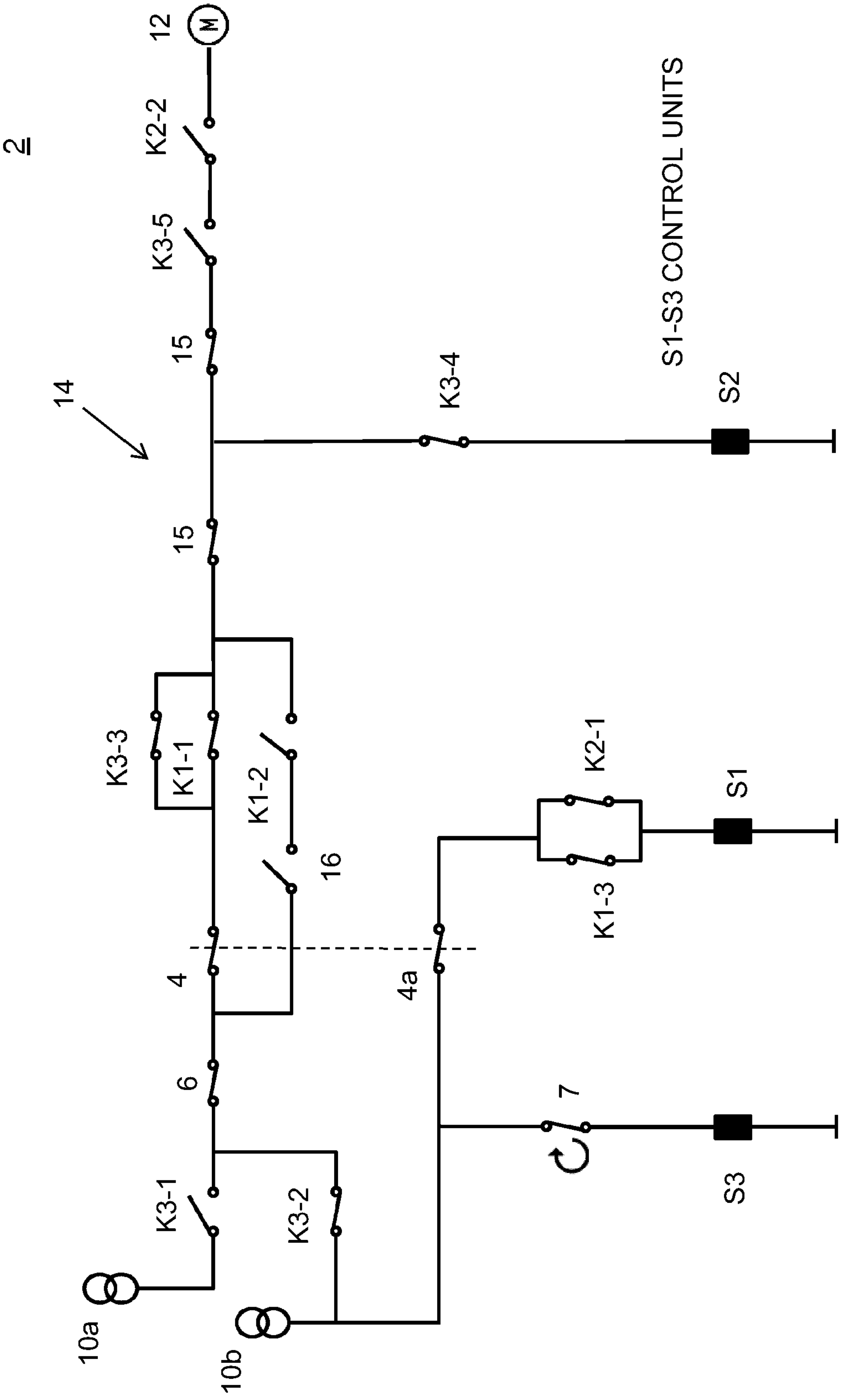
FIG 3.6

ELEVATOR SAFETY SWITCHING SYSTEM AND METHOD FOR SWITCHING BETWEEN OPERATING MODES

FIELD

The present invention relates to an inspection control system of an elevator system and a method for switching an elevator system between a normal operating mode and an inspection operating mode. The invention further relates to an elevator system having such an inspection control system.

BACKGROUND

An elevator system serves to transport people within buildings, wherein an elevator car is moved between different floors in an elevator shaft. In order to be able to guarantee the safety of passengers or service personnel, safety-relevant current states of a number of its components should be monitored within an elevator system. There are usually many serviceable and/or maintenance-requiring components in the elevator shaft. For the maintenance of such components or for carrying out regular inspection and maintenance work, the elevator system is put into an inspection operating mode or maintenance mode in which operation of the elevator car is blocked or the elevator car may move at a walking speed by manual control or can be moved only between specific positions within the elevator shaft.

In order to be able to carry out inspection and maintenance work in an elevator shaft, a service technician has to get into an elevator shaft via a shaft door, wherein a maintenance switch usually has to be operated before entering the elevator shaft, which is usually located inside the elevator shaft next to the shaft door. The maintenance switch can, for example, be referred to as an emergency stop switch which, when activated, can interrupt a so-called safety chain—also known as a safety circuit. The safety chain is a serially connected circuit having a discrete number of switches that are configured to indicate the status of the doors and the position of the elevator car. A door switch is typically provided on a car door and on each of a plurality of shaft doors, which switch is closed as long as the respective door is closed. Several door switches are connected in series as components of the safety chain, so that the safety chain as a whole is only closed when all door switches are closed. In this case, it can be assumed that all car and shaft doors are currently closed. The shaft doors are thus coupled with such a safety chain of the elevator system. If one of the shaft doors or door switches can be opened, the elevator car must not move or must no longer move. This can be implemented, for example, by interrupting a power supply to a drive of the elevator car.

An example of safety chains for elevator systems and their operation is given, for example, in EP 2214998 A1 (see WO 2009/073001 A1). The safety chain is a series circuit that comprises switches and contacts. The safety chain actuates relays that control the current to the electric motor and the brake. Some parts of the safety chain can be bridged, other parts can be inserted to change the safety monitoring for special operating modes during inspection, maintenance, and rescue operations.

For inspection and maintenance work, an easily accessible operating device is generally available in the shaft pit as an operating device in order to be able to control the elevator car manually during maintenance work. This device must be switched on by a changeover switch. After completing maintenance work and after leaving the elevator shaft, the inspection or maintenance mode can be ended by actuating, e.g. deactivating, the controller and the maintenance switch, and by closing or locking the shaft door and, as a result, the elevator system can be returned into regular drive operation in which the elevator controller can move the elevator car by closing the safety chain. In regular drive operation, the elevator car can be moved, for example, despite the presence of personnel in the elevator shaft. It is particularly dangerous that the safety chain is closed because of a software, control or switch contact error if, after an inspection/maintenance work, the operating device has already been deactivated but the maintenance switch has not yet been switched on. Such a case could often occur if the operating device is located in a deep shaft pit and the maintenance switch is arranged in a higher position next to a shaft door/maintenance hatch of the operating device. In this case a service technician who is in a shaft pit should normally first climb up a ladder after maintenance work to turn on the maintenance switch, then go back into the shaft pit and switch the elevator system from maintenance operation to normal operation using the operating device. Afterwards he has to climb up the ladder again, open a shaft door and step out of the shaft. Since it is too much effort or the technician has inadvertently not adhered to the sequence of operations, the elevator system could be put into normal operation with the maintenance switch not switched on while the technician is still in the shaft. If possible, such a dangerous scenario should be avoided.

EP 2033927 A1 relates to a safety device of an elevator system. If an elevator car with an open car door leaves a door zone or reaches a door zone at an impermissible acceleration or speed, a control signal for braking the elevator car is generated.

EP 1159218 A1 (see WO00/51929A1) describes an elevator safety system, wherein an electronic safety controller can communicate with a plurality of bus nodes via a safety bus. The electronic safety controller processes the data received from the bus nodes and determines whether there is an unsafe state, and if so, the safety controller sends a stop signal to the drive and brake unit and also sends a status signal to the elevator controller.

EP 2214998 A1 discloses a system for recognizing the presence of a person within an elevator shaft. The system comprises a passive infrared detector positioned for detecting infrared radiation from within the elevator shaft and a local processor that compares an infrared profile generated by signals from the passive infrared detector with a reference infrared profile to determine if a person is present in the elevator shaft.

DE 110201101050918 T5 (see WO 2013/084279 A1) relates to an elevator safety operating device which controls the operation of the elevator from a safety standpoint. Two reset switches 11 and 12 are disclosed which can set an elevator system from a maintenance operating mode to an automatic operating mode. The elevator safety operating device can determine the presence of a service technician with the aid of the reset switches. Before a safety chain can then immediately be connected to an electric motor, it must first be checked whether an already closed safety chain of the elevator system has really been completely closed. Such reset switches can be arranged inside or outside the shaft of the elevator system.

SUMMARY

The invention is based on the task of ensuring the work safety of an elevator system not only during maintenance/ inspection or installation work, but also afterwards when the elevator system is switched back to a normal operating mode. Among other things, there may be a need for a security measure that can be used to ensure that service personnel can safely enter or leave an elevator shaft.

According to the invention, an inspection control system of an elevator system is provided which comprises an elevator car and an electric motor, wherein the electric motor is able to drive the elevator car to move in a shaft of the elevator system, and wherein the shaft comprises at least one shaft door. The shaft door can be opened either alone or together with a car door of the elevator car. The inspection control system comprises a safety chain which comprises at least one door contact switch for determining or monitoring an open and/or closed state of the shaft door or the car door and an operating device in the shaft connected in series. The operating device comprises a changeover switch for switching the elevator system into a normal or inspection operating mode. The safety chain is closed in order to drive the elevator car via the electric motor, whereby a current path can be established between an electrical supply source and the electric motor. The safety chain is accordingly interrupted in order to interrupt the current path and thus to stop the elevator car. To control the safety chain and/or the current path, the inspection control system also comprises a manual switch outside the elevator shaft and at least one control element. The series circuit of the safety chain can be electrically closed or interrupted by activating or deactivating the control element, while the current path to the electric motor remains permanently interrupted until the manual switch is actuated when the changeover switch of the operating device switches the elevator system from the inspection operating mode to the normal operating mode.

In particular, that or at least one of the control elements can be activated by actuating the manual switch. The control element or at least one of the control elements can advantageously be deactivated by switching the elevator system into the inspection operating mode by means of the changeover switch. Since the safety chain can be controlled from the outside of the elevator shaft with the help of a control element, it is possible that the elevator system is first switched to normal operating mode and then, when service personnel have confirmed an exit from the shaft, is set to normal operation.

When the elevator system is switched from the inspection operating mode to the normal operating mode by means of the changeover switch on the control panel, the safety chain is closed, but it remains initially separated from the electric motor. In other words, although the elevator system is in normal operating mode in this case, it is not yet directly set to normal operation. A distinction must be made here that a normal operating mode is not the same as normal operation. Switching the elevator system to a normal operating mode means that the elevator system is now suitable for normal operation, but has not yet been set to normal operation. The safety chain is only then connected to the electric motor for driving the elevator car after the manual switch outside the shaft has been manually confirmed at least once. If the drive or the electric motor is viewed as part of the safety chain, it should be understood that the safety chain as a whole remains permanently interrupted until a service technician has manually operated the manual switch. The elevator system is only put into normal operation when the safety chain has been closed as a whole. It can thus be ensured that the technician remaining in the shaft is protected before he has left the shaft. If the operating device is located in the shaft pit of the elevator shaft, the inspection control system can be of great help to the technician, in particular, if maintenance/inspection work has to be carried out in the shaft pit or if he wants to move the elevator car when he is in the shaft pit. The elevator system can therefore be reliably put into an inspection operating mode and a normal operating mode without a dangerous movement of the elevator car being possible in the presence of personnel in the shaft or under certain circumstances with a potential risk.

According to an advantageous embodiment of the preceding invention, the control element is a control relay which comprises a control unit and one or more switches. Such a relay could, for example, be a current relay and is able to switch over all switches of this relay at the same time when current flows through its control unit. The control relay can control an operating switch connected in series to the safety chain in order to establish or interrupt the current path to the electric motor. One or more switches from the control relay(s) can serve as the operating switch. Because the operating switch is opened or closed, the electric motor can be blocked or released for driving. If all switches of the safety chain are physically or electrically closed, the safety chain is still separated from the electric motor by the operating switch. Even if a software error or faulty signal communication occurs and consequently a function of an elevator controller fails, the safety chain can be reliably connected in series.

According to an alternative advantageous embodiment of the preceding invention, the control element comprises one or more electronic circuits for controlling the safety chain and/or the current path. That is, instead of the control relay or relays, a different type of electronic circuit can be used, such as a programmable electronic system in safety-related applications (PESSRAL), which has the same function as the control relay or relays.

According to another advantageous embodiment of the preceding invention, the operating device comprises a control switch. The operating device can only control the electric motor via the control switch in the inspection operating mode for driving the elevator car. A control switch can for example be a direction switch, via which the elevator car can be controlled for moving in an upward or downward direction. By means of the electric motor, the elevator car is therefore driven to move automatically in the normal operating mode, for example under an elevator controller, and in the inspection operating mode under manual operation by means of the operating device.

According to another advantageous embodiment of the preceding invention, the safety chain has at least one further switch, which is provided for switching the safety chain, for deactivating the operating device, for preventing and/or for interrupting movement of the elevator car. Such an expansion option for the safety chain or the inspection control system can continue to ensure safety monitoring for the elevator system more reliably. The further switch can be an emergency stop switch, which is fastened, for example, to an inner wall of the elevator shaft or in the vicinity of a shaft door and/or is arranged on the operating device. By pressing the emergency stop switch, an immediate remedy can be obtained if the operating device fails and a hazard arises.

According to a second aspect of the invention, a method according to the invention for switching an elevator system between normal and inspection operation is provided, which comprises an elevator car and an electric motor, wherein the electric motor can drive the elevator car to move in a shaft of the elevator system, and wherein the shaft at least includes a shaft door. A safety chain is designed as a series circuit of at least one door contact switch and an operating device that is in the shaft, with an open and/or closed state of the shaft door being determined by the door contact switch. The elevator system is switched to a normal operating mode or an inspection operating mode by means of a changeover switch of the operating device. A current path is established between an electrical supply source and the electric motor by the closed safety chain for driving the elevator car and interrupted by the interrupted safety chain for stopping the elevator car. The safety chain and/or the current path can be controlled by a manual switch, which is arranged outside the shaft, and at least one control element in such a way that the series circuit of the safety chain is electrically closed or interrupted by activating or deactivating the control element, while the current path remains interrupted from the electric motor until the manual switch is actuated when the changeover switch of the operating device switches the elevator system from the inspection operating mode to the normal operating mode.

According to a third aspect of the invention, an elevator system according to the invention is provided with an inspection control system according to the invention or can be carried out by a method according to the invention.

It is pointed out that some of the possible features and advantages of the invention are described herein with reference to different embodiments of the inspection control system on the one hand and a method for switching an elevator system between a normal operating mode and an inspection operating mode on the other hand. A person skilled in the art will recognize that the features can be suitably combined, adapted, or replaced in order to arrive at further embodiments of the invention.

DESCRIPTION OF THE DRAWINGS

An advantageous embodiment of the invention will be described below with reference to the enclosed drawings, wherein neither the drawings nor the description is to be interpreted as limiting the invention. The drawings are only schematic and are not true to scale.

In which.

DETAILED DESCRIPTION

Figure 1:
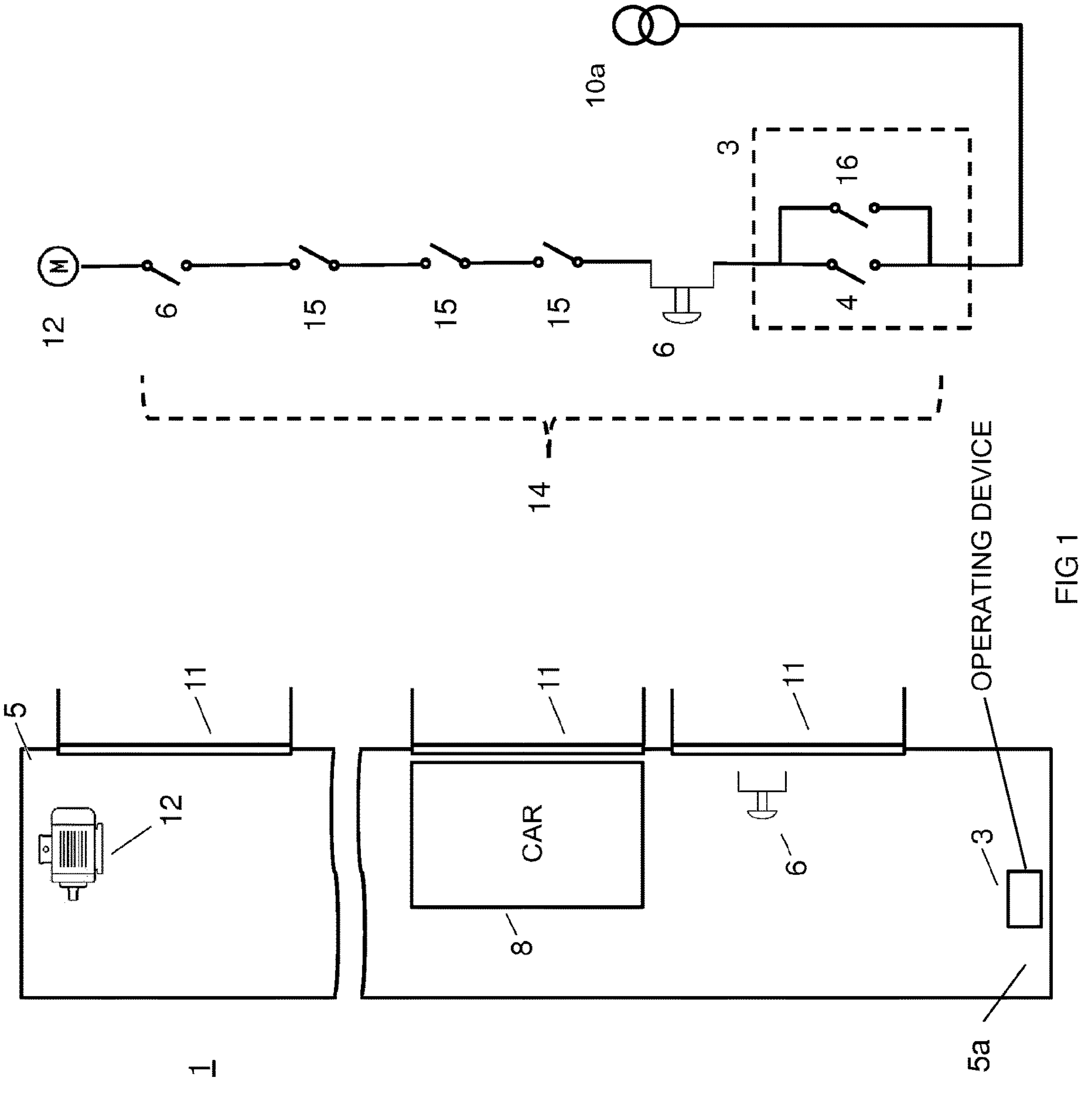
FIG. 1 is a schematic representation of an elevator system.

FIG. 1 illustrates an elevator system 1, with a simplified schematic representation of a safety chain 14 being shown accordingly. The safety chain 14 is used to monitor a state of a plurality of safety-related parameters of the elevator system 1. An electric motor 12 drives an elevator car 8 in an elevator shaft 5 between different floors for transporting people. A shaft door 11 is provided on each floor and a car door (not shown) is provided on the elevator car 8. The shaft door 11 can be opened or closed alone or together with the car door. At least one door contact switch 15 is provided on each of the shaft doors 11 and on the car door, with the aid of which it can be monitored whether the respective shaft or car door is currently closed or open. In particular, the door contact switches 15 are connected in series, so that a part of the safety chain thus formed is only closed as a whole when all the door contact switches 15 are closed. Even if only one door contact switch 15 is open, the elevator car 8 is considered unsafe and is shut down by the controller.

Figure 2:
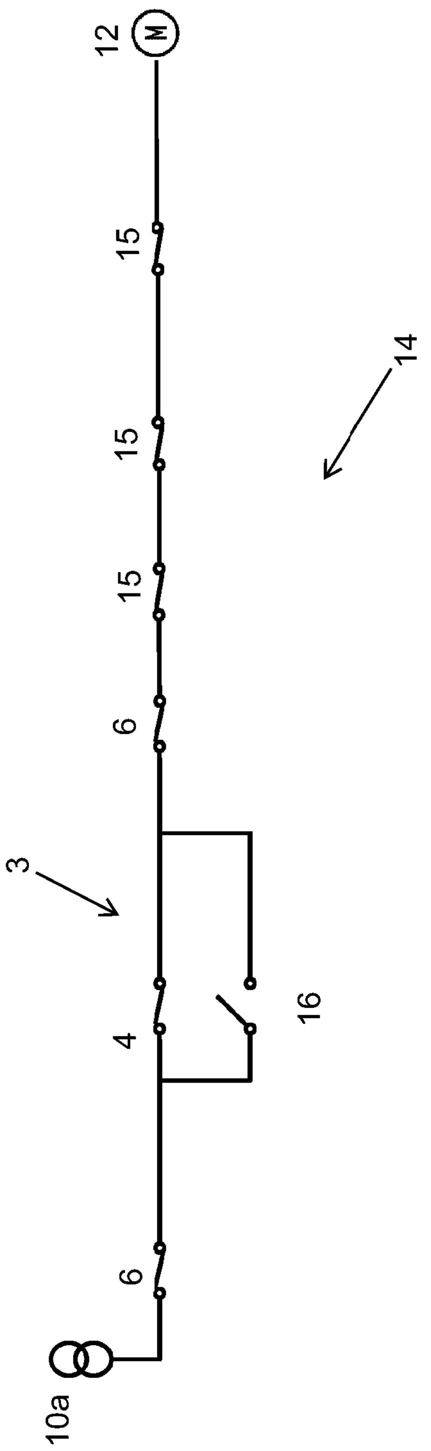
FIG 2 (Prior Art)
FIG. 2 shows the schematic structure of a conventional safety chain in an elevator system, FIG. 3 (collectively FIGS. 3.1 through 3.6) shows the schematic structure of the safety chain of an inspection control system according to the invention.

FIG. 2 shows a conventional safety chain 14, which is presented as a circuit based on the safety chain 14 in FIG. 1. This circuit is supplied with an electrical supply source—for example a power source 10*a* in this exemplary embodiment—and has one or more door contact switches 15, an operating device 3 and at least one further switch 6. By means of this further switch, the safety chain 14 can be closed or interrupted either manually or automatically. The further switch 6 is, for example, an emergency stop switch which is arranged in the shaft 5 (see FIG. 1). The operating device 3 has a changeover switch 4 for switching the elevator system 1 into a normal or inspection operating mode and a control switch (e.g., a direction switch) 16 for controlling an elevator car 8 for moving in an upward or downward direction. If necessary, other switches 6 can be further connected to the safety chain 14. It is important that all switches belonging to the safety chain are connected to one another in a series circuit. Only when the safety chain 14 is closed as a whole can a current path to the electric motor 12 and to the power supply of the elevator system 1 be established so that the elevator system 1 is set to the normal or inspection operating mode in order to be able to drive the elevator car 8 to move in the elevator shaft. The current state of the safety chain 14, which is shown in FIG. 2, is for an elevator system 1 set in normal operation.

FIG. 3 consists of FIG. 3.1 to FIG. 3.6, which show an inspection control system 2 according to the invention in different switching states. In addition to the conventional safety chain 14 according to FIG. 2, a control circuit is arranged which is supplied either separately from the current source 10*a* to the safety chain 14 or from another current source 10*b*. The control circuit includes a manual switch 7, which is located outside the shaft 5, and three control elements K1, K2 and K3. In this exemplary embodiment, the control elements are three control relays, each of which has a control unit S1, S2, S3 and one or more switches. With simple buttons, touch and other technologies, the manual switch 7 can be designed with a variety of design options, such as in the form of a reset button, a rotary switch, a pressure switch, a toggle switch or a combined group of switches. In this embodiment, the control relay K1 controls its three switches K1-1 to K1-3, the control relay K2 controls its two switches K2-1 and K2-2, and the control relay K3 controls its five switches K3-1 to K3-5. All switches of a control relay do not have to be in the same switching state but switch over at the same time. The switches K2-2 and K3-5 serve as an operating switch, which can be connected in series independently of one another to lock and release the electric motor 12. For better clarity, control units S1, S2, S3 are shown symbolized in FIG. 3 in each case by a rectangular block, an activated control unit being marked with a black block, while a deactivated control unit is marked with a white block. An inspection switch 4*a* is arranged between the power source 10*b* and the control unit S1, which is always switched over simultaneously with the changeover switch 4 and interacts with the switches K1-3 or K2-1 to allow or interrupt a current flow to the control unit S1. The inspection switch 4*a* and the changeover switch 4 can alternatively be designed as a switch and belong to the operating device 3.

FIG. 3.1 shows the inspection control system 2 according to the invention with a closed safety chain 14 when the elevator system 1 is in the normal operation mode. The safety chain 14 and the control circuit are fed separately from the current sources 10*a* and 10*b*. The changeover switch 4 of the operating device 3 is in a normal operating switch position. Since a current flows through the control unit S1, the switches K1-1 and K1-3 are closed, as a result of which the safety chain 14 is closed. The elevator system 1 can now be driven by the electric motor 12.

FIG. 3.2 shows the inspection control system 2, wherein the safety chain 14 can be closed or interrupted manually by means of the operating device 3 during inspection work. It is assumed that the operating device 3 is located in the shaft pit 5*a* (see FIG. 1) of the shaft 5 and the inspection work is to be carried out in a shaft pit 5*a*. After a technician (not shown) enters the shaft pit 5*a*, he has to switch the changeover switch 4 of the operating device 3 to switch to an inspection switch position. The control relay p is activated when switching over because a current flow from the current source 10*b* to the control unit S1 is interrupted. The switches K1-1 and K1-3 are opened as a result of the activation of the control relay K1, whereas the switch K1-2 is closed. The safety chain 14 is thus interrupted first. However, since the switch K1-2 remains closed, the safety chain 14 can be closed manually and interrupted again in that the technician manually closes or opens the control switch or the direction switch 16 of the operating device 3. The elevator system 1 or the elevator car 8 can thus be driven in an upward or downward direction by the electric motor 12.

FIG. 3.3 shows that the safety chain 14 initially remains interrupted when the technician switches the changeover switch 4 back to the normal operating switch position after the inspection work. At this moment the technician is still in shaft 5. Although the elevator system 1 has now been switched to normal operation, it should not be set to normal operation beforehand for safety reasons, because the safety chain 14 remains interrupted by the open switches K1-1, K3-3 and the non-actuated control switch 16 and, as a result, cannot move the elevator car 1 automatically in the meantime. The technician can then leave the shaft pit 5*a* and go to the outside of the shaft 5 via a shaft door 11. In this case, the technician is safely protected on a route between the shaft pit 5*a* and the shaft door 11.

FIG. 3.4 to FIG. 3.5 show how the inspection control system 2 switches when the technician leaves the shaft 5 and has manually operated the manual switch 7. Since the control unit S3 of the control relay K3 is fed from the power source 10*b* as a result of the switched-on manual switch 7, the switches K3-1 and K3-5 are opened. At the same time, however, the switches K3-2, K3-3 and K3-4 are closed, as a result of which the safety chain 14 is connected to the second current source 10*b* through the switch K3-2. As a result of the closed switches K3-3 and K3-4, it in turn forms a continuous current path via the safety chain 14 to the control unit S2 of the control relay K2 (FIG. 3.5). The activated control relay K2 then opens the switch K2-2. Since the switches K3-5 and K2-2 are opened, the electric motor 12 remains blocked in advance despite a closed safety chain 14.

FIG. 3.6 shows how the inspection control system 2 continues to be switched after the switching state shown in FIG. 3.5. Due to the activated control unit S2 of the control relay K2, the switch K2-1 is also switched on. The relay K1 is thus activated by a current supplied to the control unit S1. The relay K1 now closes the switches K1-1 and K1-3 or opens the switch K1-2. Since the two switches K3-5 and K2-2 remain open, the electric motor 12 is always separated from the closed safety chain 14.

The inspection control system 2 can then switch and set the elevator system 1 to normal operation again. Now the technician releases the manual switch 7 or the manual switch 7 releases itself with a reset function. Current then no longer flows through the control unit S3 and it is deactivated, whereby the switches K3-1, K3-5 are closed and K3-2, K3-3 and K3-4 are opened. The safety chain 14 is again supplied from the power source 10*a* via the closed switch K3-1. The switching state of the safety chain 14 or the inspection control system 2 corresponds to the switching state shown in FIG. 3.1. In other words, the inspection control system 2 has a closed safety chain 14, and the elevator system 1 is only reset to normal operation again from this moment onwards.

In summary, an elevator system 1 which has an inspection control system 2 according to the invention or is controlled by this system is ensured when switching from an inspection operation to normal operation, because the elevator car 8 is prevented from moving if it is not determined whether a technician has left the shaft 5 of the elevator system 1 after an inspection work. This is independent of whether the safety chain 14 is closed or interrupted. Before manual actuation is carried out, it can also be understood that the drive of the elevator car 8, for example the electric motor 12, is always disconnected from an electrical supply source 10*a*, 10*b*.

Finally, it should be noted that terms such as "having," "comprising," etc. do not preclude other elements or steps, and terms such as "a" or "an" do not preclude a plurality of elements or steps. Furthermore, it should be noted that features or steps that have been described with reference to one of the above exemplary embodiments can also be used in combination with other features or steps of other exemplary embodiments described above.

It is pointed out that possible features and advantages of embodiments of the invention are described here partly with reference to a method according to the invention and partly with reference to a device according to the invention. A person skilled in the art will recognize that the individual features can be combined, modified, or exchanged in a suitable manner and that features described in particular for the method can be transferred analogously to the device and vice versa in order to arrive at further embodiments of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 elevator system
2 inspection control system
3 operating device
4 changeover switch
4*a* inspection switch
5 shaft
5*a* shaft pit
6 another or further switch
7 manual switch
8 elevator car
10*a* a first power source
10*b* a second power source
11 shaft door
12 electric motor
14 safety chain
15 door contact switch
16 control switch/direction switch
Kn-x a switch of the control relay (n=1 to 3, x=1 to 5)
S1-S3 control unit of the control relay

The invention claimed is:

1. An inspection control system of an elevator system, the elevator system including an elevator car and an electric motor, wherein the motor drives the elevator car to move in a shaft of the elevator system and wherein the shaft has at least one shaft door, and a safety chain that includes at least one door contact switch for determining an open and/or closed state of the at least one shaft door connected in a series circuit with an operating device in the shaft, wherein the operating device includes a changeover switch for switching the elevator system between a normal operating mode and an inspection operating mode, and wherein the safety chain when closed establishes a current path between an electrical supply source and the motor for driving the elevator car and the safety chain when interrupted interrupts the current path for stopping the elevator car, the inspection control system comprising:

a manual switch and at least one control element for controlling the safety chain, the manual switch being located outside the shaft, the manual switch being electrically separate from the series circuit of the safety chain; and wherein the series circuit of the safety chain is closed by activating the at least one control element and is interrupted by deactivating the at least one control element, and wherein while the safety chain and thus the current path to the motor remains interrupted until the manual switch is actuated when the changeover switch of the operating device switches the elevator system from the inspection operating mode to the normal operating mode.

2. The inspection control system according to claim 1 wherein actuation of the manual switch activates the at least one control element.

3. The inspection control system according to claim 1 wherein switching the elevator system into the inspection operating mode by the changeover switch deactivates the at least one control element.

4. The inspection control system according to claim 1 wherein the at least one control element is a control relay that includes a control unit and at least one switch.

5. The inspection control system according to claim 4 wherein the at least one switch is an operating switch connected in the series circuit of the safety chain and the control relay controls the operating switch to alternately establish and interrupt the current path to the electric motor.

6. The inspection control system according to claim 1 wherein the at least one control element is an electronic circuit for controlling the safety chain and the current path.

7. The inspection control system according to claim 6 wherein the electronic circuit is a programmable electronic system in safety-related applications.

8. The inspection control system according to claim 1 wherein the operating device includes a control switch that controls the motor for driving the elevator car in the inspection operating mode only.

9. The inspection control system according to claim 1 wherein the safety chain includes a further switch for switching the safety chain to deactivate the operating device for preventing or interrupting movement of the elevator car.

10. The inspection control system according to claim 1 wherein the operating device is located in a shaft pit of the shaft.

11. A method for switching an elevator system between a normal operating mode and an inspection operating mode, the elevator system including an elevator car and an electric motor driving the elevator car to move in a shaft of the elevator system, and wherein the shaft has at least one shaft door, the method comprising the steps of:

providing a safety chain having at least one door contact switch and an operating device connected in a series circuit, the operating device being in the shaft, wherein an opening and/or closing state of the at least one shaft door is determined by the at least one door contact switch;

switching the elevator system between the normal operating mode and the inspection operating mode with a changeover switch of the operating device;

establishing a current path between an electrical supply source and the electric motor through the safety chain when closed for driving the elevator car and interrupting the current path by interrupting the safety chain to stop the elevator car from moving; and controlling the safety chain and the current path by actuating a manual switch arranged outside the shaft to activate at least one control element to close the series circuit of the safety chain and to deactivate the at least one control element to interrupt the series circuit of the safety chain, the manual switch being electrically separate from the series circuit of the safety chain, and keeping the current path to the motor interrupted until the manual switch is actuated when a changeover switch of the operating device switches the elevator system from the inspection operating mode to the normal operating mode.

12. The method according to claim 11 including deactivating the at least one control element by switching the elevator system into the inspection operating mode using the changeover switch.

13. The method according to claim 11 including during the inspection operating mode of the elevator system, controlling the motor only with a control switch of the operating device in order to drive the elevator car.

* * * * *